Patented Apr. 10, 1951

2,548,571

UNITED STATES PATENT OFFICE 2,548,571

MEROCYANINE DYES CONTAINING A BENZIMIDAZOLE NUCLEUS

Earl J. Van Lare and Leslie G. S. Brooker, Rochester, N. Y., assignors to Eastman Kodak Company, Rochester, N. Y., a corporation of New Jersey No Drawing. Application May 21, 1948, Serial No. 28,537

8 Claims. (Cl. 260—240.4)

This invention relates to new dyes and to a process for preparing them.

Certain dyes of the cyanine class are known to extend the sensitivity of photographic silver halide emulsions. More recently certain dyes of the merocyanine class have also been found to increase the spectral sensitivity of such emulsions. We have found new and unusual merocyanine dyes and that these new dyes increase the spectral sensitivity of photographic silver halide emulsions.

It is an object of the present invention to provide new merocyanine dyes containing a benzimidazole nucleus and to provide a process for preparing such dyes. A further object is to provide photographic silver halide emulsions sensitized with such dyes. A still further object is to provide a process for preparing photographic silver halide emulsions containing these new merocyanine dyes. Other objects will become apparent hereinafter.

We have found that the benzimidazole nucleus is exceptional in that certain of the merocyanine dyes containing it show quite unusual optical behavior in that the light absorption of their solutions is shifted to markedly shorter wave lengths with increasing polarity of the solvent. The more common behavior is for the absorption of a dye to be shifted to longer wave lengths with increase of polarity of the solvent. (This latter behavior is closely related to, although not identical with, Kundt's rule which says that, in general, the absorption of a dye is shifted to longer wavelengths with increasing refractivity of the solvent.)

The new merocyanine dyes of our invention can be represented by the following general formula:

I

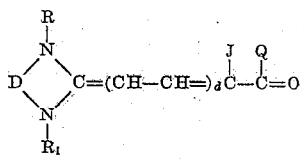

wherein R represents a member selected from the group consisting of an alkyl group, e. g., methyl, ethyl, n-propyl, isopropyl, n-butyl, n-amyl (especially a primary alkyl group of the formula $C_nH_{2n+1}$ wherein $n$ is a positive integer from 1 to 5), $\beta$-methoxyethyl, $\beta$-ethoxyethyl, etc., and an aryl group, such as phenyl, o- and p-tolyl, o- and p-chlorophenyl, etc. (i. e. a mononuclear aryl group of the benzene series having from 6 to 7 carbon atoms), $R_1$ represents an alkyl group, e. g. methyl, ethyl, n-propyl, n-butyl, n-amyl (especially a primary alkyl group of the formula $C_nH_{2n+1}$ wherein $n$ is a positive integer from 1 to 5), $\beta$-methoxyethyl, $\beta$-ethoxyethyl, $\beta$-hydroxyethyl, $\gamma$-hydroxypropyl, carboxyethyl, $\alpha$-carboxyethyl, $\beta$-carboxyethyl, $\beta$-sulfoethyl, $\beta$-acetoxyethyl, $\alpha$-carbomethoxyethyl, $\beta$-carbomethoxyethyl, $\alpha$-carbethoxyethyl, $\beta$-carbethoxyethyl, allyl, benzyl, $\beta$-phenylethyl, phenoxymethyl, $\beta$-phenoxyethyl, $\beta$-phenylmercaptoethyl, etc., D represents a divalent o-arylene radical, e. g. an o-phenylene group or an o-naphthylene group (including those groups substituted by a chlorine atom, a bromine atom, a methyl group, an ethyl group, a methoxyl group, an ethoxyl group, etc.), J represents a member selected from the group consisting of a cyano group, a carboxyl group, a carbalkoxyl group (e. g. a carbomethoxyl group or a carbethoxyl group), an acyl group of a carboxylic acid (e. g. acetyl, propionyl, etc.), a carbamyl group and a heterocyclic nucleus of the quinoline series (e. g. a 2- or 4-quinolyl group), Q represents a member selected from the group consisting of a hydroxyl group, an alkyl group (e. g. a methyl group or an ethyl group), an aryl group (e. g. a phenyl group, an o- or p-tolyl group), an amino group (e. g. a —NH₂ group, an anillino group, etc.), a carbalkoxyl group, (e. g. a carbomethoxyl group or a carbethoxyl group), an alkoxyl group (e. g. a methoxyl group, an ethoxyl group, etc.) and a heterocyclic nucleus of the benzofuryl series (e. g. a 2-benzofuryl group) and J and Q together represent the non-metallic atoms necessary to complete a nucleus selected from the group consisting of a heterocyclic nucleus containing from 5 to 6 atoms in the heterocyclic ring, and a carbocyclic nucleus containing 5 atoms in the ring (e. g. an indandione nucleus), and $d$ represents a positive integer from 1 to 3. Especially advantageous are the merocyanine dyes represented by the above general formula wherein J and Q together represent the non-metallic atoms necessary to complete a heterocyclic nucleus having from 5 to 6 atoms in the heterocyclic ring. Typical of such nuclei are a thiazolone nucleus, for example, a 2,4(3,5)-thiazoledione nucleus, such as 2,4(3,5)-thiazolediones, 3-alkyl-2,4(3,5)-thiazolediones (e. g. 3-ethyl-2,4(3,5)-thiazoledione), 3-phenyl-2,4(3,5)-thiazoledione, 3-$\alpha$-naphthyl-2,4(3,5)-thiazoledione, a 2-thio-2,4(3,5)-thiazoledione (a rhodanine) nucleus, such as a 3-alkyl-2-thio-2,4(3,5)-thiazoledione (3-alkyl-rhodanine) (e. g. 3-ethyl-2-thio-2,4(3,5)-thiazoledione or 3-ethylrhodanine), 3-phenyl-2-thio-2,4(3,5)-thiazoledione (3-phenyl-rhodanine) or 3-$\alpha$-naphthyl-2-thio-2,4(3,5)-thiazoledione (3-α-naphthylrhodanine nuclei or 3-(1-benzothiazyl) - 2 - thio-2,4(3,5)-thiazoledione (3-(1-benzothiazyl) rhodanine) nuclei, a 2-alkylmercapto-4(5)-thiazolone nucleus, such as 2-ethylmercapto-4(5)-thiazolone, a thiazolidone nucleus, such as 4-thiazolidone or its 3-alkyl (e. g. ethyl), 3-phenyl or 3-α-naphthyl derivatives, a 2-alkylphenylamino-4(5)-thiazolone nucleus or a 2-diphenylamino-4(5)-thiazolone nucleus; an oxazolone nucleus, for example, a 2-thio-2,4(3,5)-oxazolidione nucleus, such as a 3-alkyl-2-thio-2,4(3,5)-oxazolidione nucleus (e. g. 3-ethyl-2-thio-2,4(3,5)-oxazolidione) and a 2-imino-2,4(3,5)-oxazolone (a pseudohydantoin nucleus; a 2-alkylmercapto-5 (4)-imidazolone nucleus, such as 2-n-propylmercapto-5-(4)-imidazolone; a thionaphthenone nucleus, such as 2-(1)-thionaphthenone or 1(2)-thionaphthenone, a pyrazolone nucleus; an oxindole nucleus, such as 2,3-dihydro-3-ketoindole, and like five-membered heterocyclic nuclei; a 2,4,6-triketohexahydropyrimidine nucleus, for example, barbituric acid or 2-thiobarbituric acid as well as their 1-alkyl (e. g. 1-ethyl) or 1,3-dialkyl (e. g. 1,3-diethyl) derivatives; a 3,4-dihydro-2(1)-quinolone nucleus, such as 3,4-dihydro-2(1)-quinolone (dihydrocarbostyril); a 3,4-dihydro-2(1)-quinoxalone nucleus, such as 3,4-dihydro-2(1)-quinoxalone (oxydihydroquinoxaline); 3-phenomorpholone (1,4,3-benzoxazine-3(4)-one or benzo-β-morpholone) nuclei; 1,4,2-benzothiazine-3(4)-one (keto-dihydrobenzoparathiazine) nuclei, and the like six-membered heterocyclic nuclei. The dyes containing a five-membered heterocyclic nucleus containing a nuclear nitrogen and a nuclear thiocarbonyl group give rise to emulsions of particular utility. Those dyes containing a six-membered heterocyclic nucleus containing two nuclear nitrogen atoms and a nuclear thiocarbonyl group are also excellently adapted for the manufacture of photographic silver halide emulsions.

The new dyes of our invention characterized by the above general formula can advantageously be prepared by reacting a benzimidazole quaternary salt selected from those represented by the general formula:

II 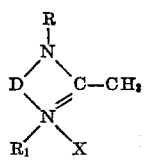

wherein R and $R_1$ have the definitions set forth above and X represents an anion, for example, $Cl^-$, $I^-$, $Br^-$, $SCN^-$, $ClO_4^-$, $CH_3COO^-$, $p\text{-}CH_3C_6H_4\text{-}SO_3^-$, $C_6H_5\text{-}SO_3^-$, $CH_3OSO_3^-$, $C_2H_5OSO_3^-$, etc., with a compound selected from those represented by the general formula:

III 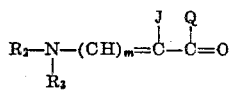

wherein J and Q have the definitions set forth above, $R_2$ represents a member selected from the group consisting of a hydrogen atom and an acyl group of a carboxylic acid, such as acetyl, propionyl or benzoyl groups, $R_3$ represents an aryl group, such as a phenyl, a diphenyl, a xylyl or a naphthyl (α or β) group (i. e. and aryl group containing from 6 to 12 nuclear carbon atoms, for example, and $m$ represents a positive odd integer from 1 to 5. Compounds represented by Formula III above wherein $m$ equals 1 have been previously described by Dains et al. See, for example, "Journal of the American Chemical Society," vol. 31 (1909), p. 1148; vol. 35 (1913), p. 959; vol. 38 (1916), p. 1841; vol. 40 (1918), p. 562; vol. 44 (1922), p. 2310; and Berichte, vol. 35 (1902), p. 2496.

Compounds represented by Formula III above can be prepared by reacting a compound selected from those represented by the general formula:

IV 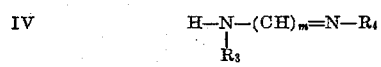

wherein $R_3$ and $m$ have the meanings set forth above and $R_4$ represents an aryl group, such as a phenyl gruop, a diphenyl group, a xylyl group, or a naphthyl (α or β) group (i. e. an aryl group having from 6 to 12 nuclear carbon atoms for example) with a compound selected from those represented by the general formula:

V 

wherein J and Q have the definitions set forth under Formula I above. In addition to the compounds such as those embraced by the heterocyclic nuclei set forth under Formula I above, J and Q together in Formula V can represent open chain compounds. Therefore, in addition to such heterocyclic compounds as 3-ethylrhodanine, compounds typified by ethyl acetoacetate, acetylacetone, malonic acid, malondiamide, diethyl malonate, acetoacetamide, alkyl (e. g. ethyl) 2-quinolyl pyruvates, acetylacetonitrile, benzoylacetonitrile, cyanoacetanilide, aceturic acid, hippuric acid, phenaceturic acid, are included within the scope of Formula V. Some of the compounds represented by Formula IV are basic and accordingly form salts with acids, such as hydrochloric, sulfuric, and the like. These salt forms can be used as well to react with the compounds represented by Formula I. Examples of compounds of Formula IV and their salts which can advantageously be employed are: diphenylformamidine, β-anilinoacrolein anil and its hydrochloride, glutaconic aldehyde dianilide hydrochloride, α-(β-naphthylimino-ε-(β-naphthylamino)-α-methyl-α, γ-pentadiene hydrochloride (see König, "Journal für praktische Chemie," vol. 69, p. 136), etc. Compounds such as diphenyl formamidine are advantageously reacted with the compounds of Formula V in the presence of a petroleum fraction, e. g. kerosene, etc. Compounds such as β-anilinoacrolein anil or glutaconic aldehyde dianilide or their hydrochlorides or other salts can be reacted with the compounds of Formula V by heating the substances together, advantageously in the presence of a strong tertiary organic base, e. g. a trialkylamine, for example, triethylamine, triisoamylamine, etc.

Compounds represented by Formula III wherein $R_2$ represents an acyl group of a carboxylic acid can be prepared by acylating the reaction products of the compounds of Formula IV and compounds of Formula V with an acylating agent, such as an organic acid anhydride, for example, acetic, propionic, butyric or benzoic anhydride. This conversion can be effected during the condensation of the compounds of Formula IV with those of Formula V, or the conversion can be effected with acid halides (e. g. chlorides) instead of acid anhydrides. We have found that the acetylated compounds of Formul III are excellently suited for preparing our new dyes.

The compounds represented by Formula II are advantageously prepared by reacting an o-halogeno-nitrobenzene (e. g. o-chloro-nitrobenzene with an excess of an organic primary amine, for example, an alkylamine, such as methylamine, ethylamine, n-propylamine, isopropylamine, n-butylamine, n-amylamine, β-methoxyethylamine, β-ethoxyethylamine, phenylamine (aniline), o- and p-tolylamine, o- and p-chlorophenylamine, etc., to give a secondary amine having a nitro group ortho to the amino group. This product can then be hydrogenated in the presence of a Raney nickel catalyst to reduce the nitro group to an amino (—NH₂) group. Upon reacting this amino compound with acetic anhydride, the free base of a benzimidazole compound having a methyl group in the 2 position is readily formed. Reaction of this product with an alkyl salt, e. g. methyl p-toluene sulfonate, ethyl β-toluenesulfonate, ethyl benzene sulfonate, dimethylsulfate, diethylsulfate, ethyl iodide, n-butyl bromide, produces the desired quaternary salt. The quaternary iodide likewise is a convenient intermediate for the preparation of other quaternary salts. For example, when a solution of the iodide is heated with an alcoholic suspension of silver thiocyanate, the corresponding quaternary thiocyanate is formed. Similarly, when the iodide is heated with an alcoholic suspension of the silver salt of a fatty acid (e. g. silver acetate), the corresponding quaternary salt of the fatty acid is formed. In like manner, other quaternary salts, e. g. chlorides, can be prepared. The benzimidazole free bases from which we prepare these quaternary salts are well known, as is the general procedure for their preparation outlined above. Hempel, "Journal für praktische Chemie" (2), vol. 41, page 166, has described the preparation of 1-ethyl-2-methyl-(1)-benzimidazole in a manner identical to that described above. A similar preparation of 2-methyl-1-phenyl-(1)benzimidazole is described by Phillips, "Journal of the Chemical Society" (London), (1929), page 2823.

Another general method for the preparation of our new merocyanine cyanine dyes comprises reacting a compound represented by the following formula:

VI

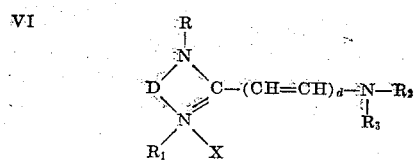

wherein R, R₁, R₂, R₃, d and X have the definitions set forth above, with a compound containing a reactive methylene group adjacent to a carbonyl group, i. e., a compound represented by the general formula:

V

wherein J and Q have the definition set forth below Formula I. The compounds represented by Formula VI can readily be obtained by reacting a quaternary salt represented by the formula:

II

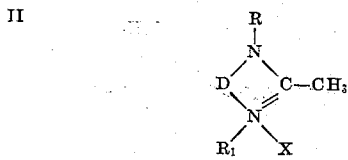

wherein R, R₁ and X have the definitions set forth above, with a compound represented by the formula:

IV 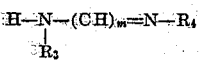

wherein R₃, R₄ and $m$ have the definitions designated above, in the presence or absence of a carboxylic acid anhydride, e. g. acetic anhydride, propionic anhydride, butyric anhydride, etc. The condensation of quaternary salts with a diaryl formamidine (diphenyl formamidine) in the presence or absence of a carboxylic acid anhydride (acetic anhydride) are described in detail in British Patent 344,409, accepted March 4, 1931. A similar method is outlined in White et al. U. S. Patent 2,263,749, dated November 25, 1941, wherein other compounds represented by Formula IV are reacted with various quaternary salts. The concomitant or subsequent acylation of such reaction products is also described in the White et al. patent.

The manufacture of the dyes of our invention, either by the condensation of the compounds of Formula II with those of Formula III, or the condensation of the compounds of Formula VI with a compound containing a reactive methylene group adjacent to a carbonyl group (e. g. the compounds represented by Formula V), is advantageously carried out in the presence of a basic condensing agent, i. e. an acid-binding agent, e. g. the trialkyl amines, such as triethylamine, tri-n-propylamine, triisopropylamine, tri-n-butylamine, etc.; heterocyclic amines, such as N-alkylpiperidine, e. g. N-methyl- and N-ethylpiperidine, etc. Alkali metal alcoholates, e. g. sodium methoxide, potassium ethoxide, etc. can also be used. Heat accelerates the reaction, and temperatures varying from about 25° C. to the reflux temperature of the reactants can be used. The condensation can also be carried out in the presence or absence of an inert diluent, if desired. Typical diluents include, for example, the lower aliphatic alcohols (i. e. one to four carbon atoms or less) such as ethyl, isopropyl, n-propyl alcohol, etc., pyridine, etc. The diluent should be inert toward the dyes, and is advantageously chosen so that the dye formed will separate therefrom at least upon cooling the reaction mixture.

The following examples will illustrate further the manner whereby we prepare the new dyes of our invention.

*Example I.*—5-[(1,3-dimethyl-2(3)-benzimidazolylidene)ethylidene]-3-ethylrhodanine

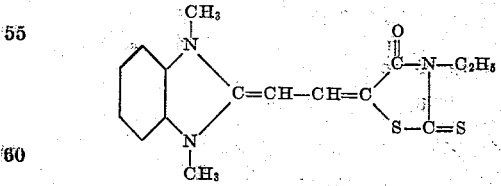

2.9 gms. of 1,2,3-trimethylbenzimidazolium iodide, 3 gms. of 5-acetanilidomethylene-3-ethylrhodanine, 15 cc. of pyridine and 1 gm. of triethylamine were placed in a glass reflux set-up, and the mixture refluxed together for 20 minutes. The reaction mixture was then cooled and precipitated by the addition of 200 cc. of anhydrous diethyl ether. The solid which separated was filtered off, washed with diethyl ether and then dried. A yield of 2.7 gms. of crude product was obtained. This product was dissolved pyridine and precipitated with methanol. After reprecipitating the product dye once again, it was dried, and reddish-orange crystals which melted

*Example II.*—*5-[(1,3-diethyl-2(3)-benzimidazo-lylidene)ethylidene]-3-ethylrhodanine*

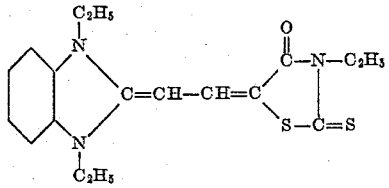

1.6 gms. of 1,3-diethyl-2-methylbenzimidazolium iodide, 1 gm. of 5-acetanilidomethylene-3-ethylrhodanine, 15 cc. of pyridine and 0.5 gm. of triethylamine were placed in a glass reflux set-up and refluxed together for 30 minutes. The reaction mixture was then chilled, and water added. The mixture was then cooled overnight, and the aqueous layer decanted off. The residue was stirred with a small amount of ethyl alcohol, whereupon a solid precipitated out of the solution. The suspension was chilled, and the solid filtered off and dried. A yield of 0.75 gm. of crude dye was obtained, which was purified by recrystallizing from ethyl alcohol. The purified product was obtained as red needles with a blue reflux having a melting point of 183° to 184° C. with decomposition.

*Example III.*—*5-[(1,3-diethyl-2(3)-benzimidazo-lylidene)ethylidene] - 3 - ethyl - 2 - thio - 2,4 - oxazolidinedione*

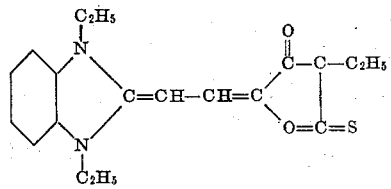

2.3 gms. of (2-acetanilidovinyl)-1,3-diethyl-benzimidazolium iodide, 0.8 gm. of 3-ethyl-2-thio-2,4-oxazolidinedione, 20 cc. of absolute ethyl alcohol and 1 gm. of triethylamine were placed in a glass reflux set-up, and the mixture refluxed for one hour. The reaction mixture was chilled to 0° C., and the solid which separated was filtered off and dried. A yield of 1 gm. of crude product was obtained, which was purified by twice recrystallizing from ethyl alcohol. The purified product was obtained as red crystals melting at 217° to 219° C. with decomposition.

*Example IV.*—*5-[(1,3-diethyl-2(3)-benzimidazo-lylidene)ethylidene] - 2 - diphenylamino - 4(5)-thiazolone*

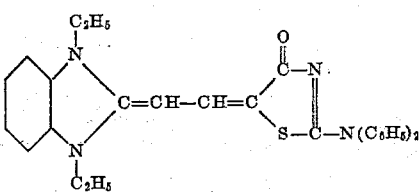

2.3 gms. of 2-(2-acetanilidovinyl)-1,3-diethyl-benzimidazolium iodide, 1.34 gms. of 2-diphenylamino-4(5)-thiazolone, 25 cc. of pyridine and 1 gm. of triethylamine were placed in a glass reflux set-up, and the mixture refluxed for one hour. The reaction mixture was then chilled, and precipitated with diethyl ether. The precipitate was washed first with diethyl ether and then with water. After drying, a yield of 1.3 gms. of crude product was obtained. This product was purified by twice recrystallizing from ethyl alcohol to give bluish-red plates which melted at 299 to 301° C. with decomposition.

When a molecularly amount of 2-imino-4-thiazolidone (pseudothiohydantoin) replaces the 2-diphenylamino-4(5)-thiazolone in the above example 5-[(1,3-diethyl-2(3)-benzimidazolylidene) ethylidene]-2-imino-4-thiazolidone represented by the formula:

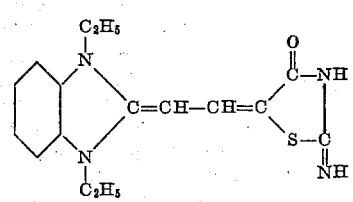

can be obtained.

*Example V.*—*3 - ethyl - 5 - [(1,3-diethyl-2(1)-naphth[1,2] - imidazolylidene) ethylidene] rhodanine*

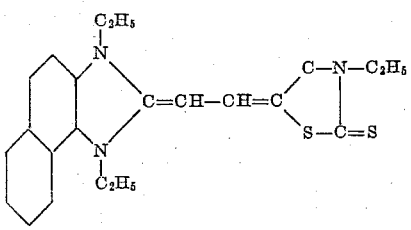

1.85 gms. of 1,3-diethyl-2-methylnaphth[1,2] imidazolium iodide, 1.5 gms. of 5-acetanilidomethylene-3-ethylrhodanine, 25 cc. of pyridine and 1 gm. of triethylamine were intimately mixed and refluxed together for one hour. The reaction mixture was chilled to 0° C., and the solid which separated filtered off, washed with water and dried. A yield of 0.7 gm. of crude product was thus obtained. Upon recrystallization from ethyl alcohol a pure product in the form of red crystals having a blue reflex was obtained. The melting point of the pure product was found to be 252 to 253° C. with decomposition.

When a molecularly equivalent amount of 3-β-hydroxyethyl - 2 - methyl - 1 - phenylbenzimidazolium iodide (prepared by the general method outlined above) replaces the naphthimidazolium iodide in the above example, 3-ethyl-5[3-β-hydroxyethyl - 1 - phenyl - 2(3) - benzimidazolylidene) ethylidene] rhodanine represented by the formula:

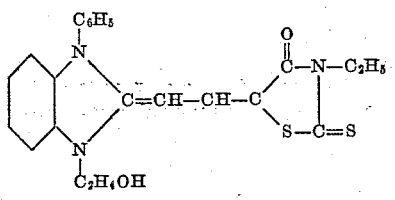

can be obtained.

*Example VI.*—*1,3 - diethyl - 5[(1,3-diethyl-2(3)-benzimidazolylidene) ethylidene]-2-thiobarbituric acid*

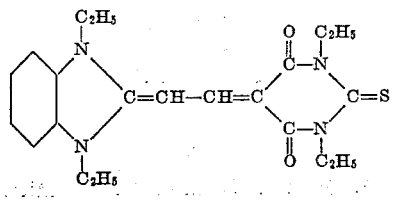

3.2 gms. of 1,3-diethyl-2-methylbenzimidazolium iodide, 3.5 gms. of 5-acetanilidomethylene-1,3-diethyl-2-thiobarbituric acid, 10 cc. of pyridine and 1 gm. of triethylamine were intimately mixed and refluxed for 30 minutes. The reaction mixture was then cooled to 0° C., and the solid which separated was filtered off, washed first with water and then alcohol, and dried. A yield of 1.7 gms. of crude product was obtained which was purified by recrystallization from ethyl alcohol to give a pure dye in the form of yellow needles melting at 311 to 312° C. with decomposition.

When a molecularly equivalent amount of 5-acetanilido - methylene - 3 - phenylrhodanine replaces the 5-acetanilidomethylene-1,3-diethyl-2-thiobarbituric acid in the above example, 5-[(1,3-diethyl-2(3)-benzimidazolylidene) ethylidene]-3-phenylrhodanine represented by the formula:

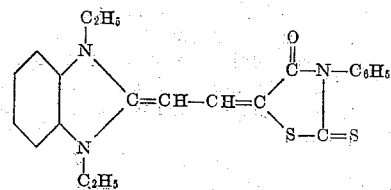

can be obtained.

*Example VII.—1,3-diethyl-5[4-(1,3-diethyl-2(3)-benzimidazolyidene) - 2 - butenylidene] - 2 - thiobarbituric acid*

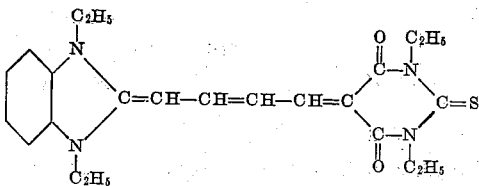

1.6 gms. of 1,3-diethyl-2-methylbenzimidazolium iodide, 1.9 gms. of 5-(3-acetanilidoallylidene)-1,3-diethyl-2-thiobarbituric acid, 10 cc. of pyridine and 0.55 gm. of triethylamine were mixed together and heated in a glass apparatus under reflux for five minutes. The reaction mixture was chilled to 0° C., and the solid which separated was filtered off, first washed with methyl alcohol and then water, and dried. There was thus obtained a yield of 0.4 gm. of crude dye which was recrystallized from ethyl alcohol to give a pure dye in the form of red needles melting at 279 to 280° C. with decomposition.

When a molecularly equivalent amount of 4-(3-acetanilido-allylidene)-1-benzothiazyl-3-methyl-5-pyrazolone replaces the 5-(3-acetanilidoallylidene)-1,3-diethyl-2-thiobarbituric acid in the above example, 1-benzothiazyl-4-[4-(1,3-diethyl-2(3) - benzimidazolylidene) - 2 - butenylidene]-3-methyl-5-pyrazolone represented by the formula:

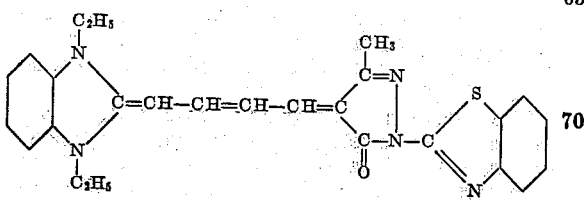

can be obtained.

*Example VIII.—1,3 - diethyl-5-[6 - (1,3 - diethyl-2(3) - benzimidazolylidene) - 2,4 - hexadienylidene] - 2 - thiobarbituric acid*

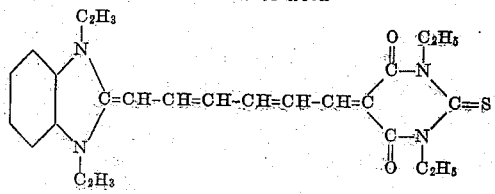

1.6 gms. of 1,3-diethyl-2-methylbenzimidazolium iodide, 2 gms. of 5-(5-acetanilido-2,4-pentadienylidene) - 1,3 - diethyl - 2 - thiobarbituric acid, 10 cc. of pyridine and 0.55 gm. of triethylamine were intimately mixed and stirred together at room temperature (25° C.) for 30 minutes. The reaction mixture was chilled to 0° C., and the solid which separated was filtered off, washed first with water and then with ethyl alcohol, and dried. There was thus obtained a yield of 0.2 gm. of crude product, which was purified by recrystallization from ethyl alcohol to give a pure dye in the form of purple needles melting at 270 to 272° C. with decomposition.

When a molecularly equivalent amount of 5-[5 - acetanilido - 2,4 - pentadienylidine] - 1-ethyloxindole replaces the 5 - (5 - acetanilido-2,4 - pentadienylidene) - 1,3 - diethyl - 2 - thiobarbituric acid in the above example, 1 - ethyl-5 - [6 - (1,3 - diethyl - 2(3) - benzimidazolylidene) - 2,4 - hexadienylidene] oxindole represented by the formula:

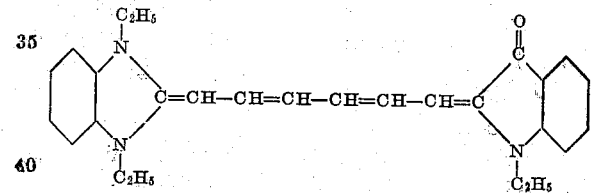

can be obtained.

*Example IX.—1,3 - diethyl - 5 - [4 - (1,3-diethyl-2(3) - benzimidazolylidene) - 2 - butenylidene] barbituric acid*

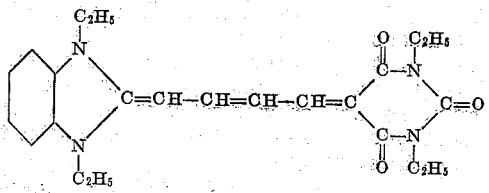

1.6 gms. of 1,3-diethyl-2-methylbenzimidazolium iodide, 1.8 gms. of 5-(3-acetanilidoallylidene-1,3-diethylbarbituric acid, 10 cc. of pyridine and 0.5 gm. of triethylamine were intimately mixed and refluxed for 3 minutes. The reaction mixture was chilled to 0° C., and the solid which separated was filtered off, washed first with methyl alcohol and then water, and dried. There was thus obtained a yield of 0.25 gm. of crude product, which was purified by recrystallization from pyridine to give a pure dye in the form of red needles melting at 304 to 305° C. with decomposition.

*Example X.—2 - [4 - (1,3-diethyl-2(3)-benzimidazolylidene) -2-butenylidene]-1,3-indandione*

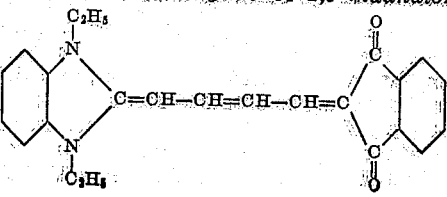

1.6 gms. of 1,3-diethyl-2-methylbenzimidazolium iodide, 1.6 gms. of 2-(3-acetanilidoallylidene) indandione, 10 cc. of pyridine and 0.5 gm. of triethylamine were mixed together and refluxed for 5 minutes. The reaction mixture was chilled to 0° C., and the solid which separated was filtered off, washed first with ethyl alcohol and then water, and dried. The 0.5 gm. of crude product so obtained was purified by dissolving in pyridine and precipitating with ethyl alcohol. The pure dye was obtained as deep red needles melting at 299 to 300° C. with decomposition.

When a molecularly equivalent amount of 1,3-di-n-amyl-2-methylbenzimidazolium p-toluenesulfonate replaces the 1,3-diethyl-2-methylbenzimidazolium iodide in the above example, 2-[4-(1,3-di-n-amyl-2(3)-benzimidazolylidene)-2-butenylidene]-1,3-indandione represented by the formula:

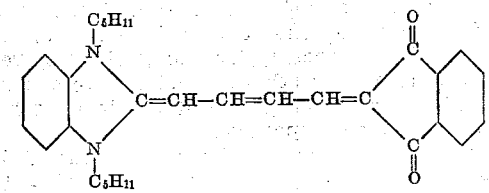

can be obtained.

*Example XI.*—*5-[4-(1,3-diethyl-2(3)-benzimidazolylidene)-2-butenylidene]-3-ethylrhodanine*

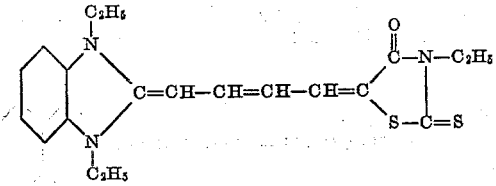

3.2 grams of 1,3-diethyl-2-methylbenzimidazolium iodide, 3.3 gms. of 5-(3-acetanilidoallylidene)-3-ethylrhodanine, 25 cc. of pyridine and 0.6 gm. of sodium methoxide were mixed together and refluxed for 15 minutes. The reaction mixture was chilled to 0° C., and the solid which separated was filtered off, washed first with methyl alcohol and then water, and dried. The crude product so obtained amounted to 2.3 gms. and was purified by dissolving in pyridine and precipitating with ethyl alcohol to give a pure dye in the form of red needles melting at 223 to 224° C. with decomposition.

*Example XII.*—*5-[4-(1,3-diethyl-2(3)-benzimidazolylidene)-2-butenylidene]-3-ethyl-2-thio-2,4-oxazolidenedione*

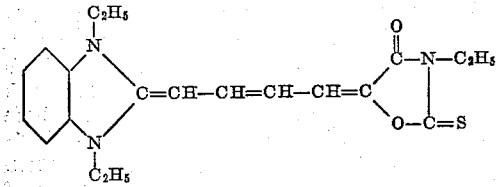

3.2 gms. of 1,3-diethyl-2-methylbenzimidazolium iodide, 3.2 gms. of 5-(3-acetanilidoallylidene)-3-ethyl-2-thio-2,4-oxazolidinedione, 25 cc. of pyridine and 0.6 gm. of sodium methoxide were mixed together and refluxed for 15 minutes. The reaction mixture was chilled to 0° C., and the solid which separated was filtered off, washed first with methyl alcohol and then water, and dried. The crude product so obtained amounted to 1 gm. and was purified by dissolving in pyridine and precipitating with ethyl alcohol to give a pure dye in the form of greenish needles with bright reflex melting at 209 to 210° C. with decomposition.

*Example XIII.*—*2-[4-(1,3-diethyl-2(3)-benzimidazolylidene)-2-butenylidene]-cyanoacetylbenzofuran*

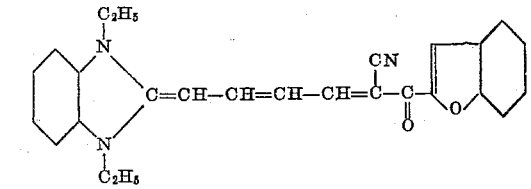

1.6 gms. of 1,3-diethyl-2-methylbenzimidazolium iodide, 1.7 gms. of 2-[3-(acetanilidoallylidene)cyanoacetyl]-benzofuran, 25 cc. of pyridine and 0.27 gm. of sodium methiodide were mixed together and refluxed for 3 minutes. The resulting red solution deposited crystals on cooling to 0° C. These were filtered off, washed first with methyl alcohol and then water, and dried. The crude dye so obtained amounted to 0.7 gm. and was purified by dissolving in pyridine and precipitating with ethyl alcohol to give a pure dye in the form of deep red plates melting at 252 to 254° C. with decomposition.

When a molecularly equivalent amount of diethyl 3-acetanilidoallylidenemalonate replaces the 2-[3-(acetanilidoallylidene)-cyanoacetyl] benzofuran in the above example, diethyl [4-(1,3-diethyl-2(3)-benzimidazolylidene)-2-butenylidene] malonate represented by the formula:

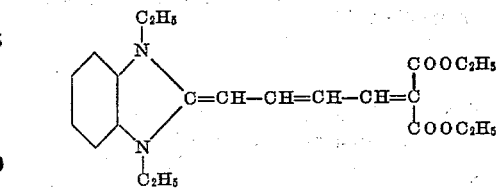

can be obtained. Similarly replacing the cyanoacetylbenzofuran compound in the above example with an equivalent amount of ethyl 2-(3-acetanilidoallylidene)acetoacetate there is obtained ethyl 2-[4-(1,3-diethyl-2(3)-benzimidazolylidene)-2-butenylidene]-acetoacetate represented by the formula:

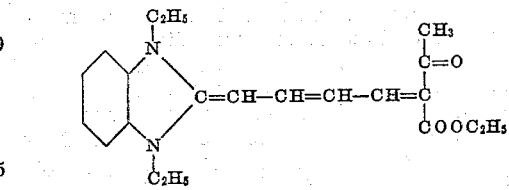

Operating in a similar manner other dyes represented by Formula I above can be obtained. All of the dyes, illustrations of which have been given above, are particularly useful in manufacturing photographic silver halide emulsions, serving to alter the sensitivity thereof. Sensitization by means of our new dyes is, of course, directed primarily to the ordinarily employed gelatino-silver-halide developing-out emulsions. The dyes are advantageously incorporated in the washed, finished emulsions and should, of course, be uniformly distributed throughout the emulsions.

The concentration of our new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The sensitizing properties of some of the more efficacious dyes of our invention are given in the table below:

| Dye of— | Sensitizing Max. (m$\mu$) | Sensitizing Range Extends to (m$\mu$) | Gelatino-Silver Halide Emulsion |
|---|---|---|---|
| Ex. 1 | 560 | 620 | Bromo-iodide. |
| Ex. 2 | 560 | 620 | Do. |
| Ex. 3 | 490 and 530 | 570 | Chloro-iodide. |
| Ex. 4 | 520 | 555 | Bromo-iodide. |
| Ex. 5 | 550 | 640 | Do. |
| Ex. 6 | 480 | 510 | Chloro-iodide. |
| Ex. 7 | 560 | 610 | Bromo-iodide. |
| Ex. 8 | 540 and 650 | 710 | Do. |
| Ex. 11 | 560 and 620 | 680 | Do. |
| Ex. 12 | 570 | 600 | Do. |
| Ex. 13 | 500 and 590 | 610 | Do. |

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

What we claim and desire secured by Letters Patent of the United States is:

1. A dye selected from those represented by the general formula:

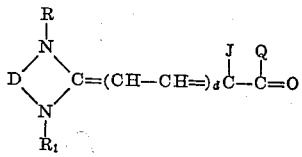

wherein R and $R_1$ each represents an alkyl group having the formula $C_nH_{2n+1}$ wherein $n$ is a positive integer from 1 to 5, D represents a divalent organic radical selected from the group consisting of an o-phenylene group and an o-naphthylene group, J and Q together represent the non-metallic atoms necessary to complete a heterocyclic nucleus of the 2-thiobarbituric acid series and $d$ represents a positive integer from 1 to 3.

2. A dye selected from those represented by the general formula:

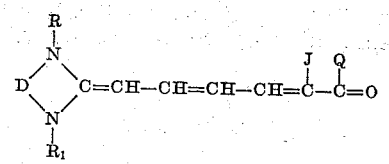

wherein R and $R_1$ represents an alkyl group having the formula $C_nH_{2n+1}$ wherein $n$ is a positive integer from 1 to 5, D represents an o-phenylene group and J and Q together represent the non-metallic atoms necessary to complete a heterocyclic nucleus of the 2-thiobarbituric acid series.

3. A dye selected from those represented by the general formula:

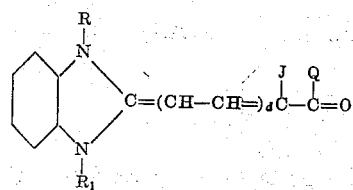

wherein R and $R_1$ each represents a primary alkyl group of the formula $C_nH_{2n+1}$ wherein $n$ is a positive integer from 1 to 5, J and Q together represent a heterocyclic nucleus of the 2-thiobarbituric acid series and $d$ represents a positive integer from 1 to 3.

4. A dye represented by the formula:

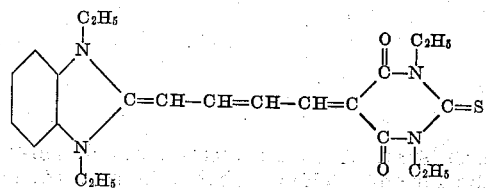

5. A process for preparing a dye which comprises reacting a quaternary salt selected from those represented by the general formula:

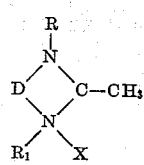

wherein R and $R_1$ each represents an alkyl group having the formula $C_nH_{2n+1}$ wherein $n$ represents a positive integer from 1 to 5, D represents a divalent organic radical selected from the group consisting of an o-phenylene group and an o-naphthylene group and X represents an anion, with a compound selected from those represented by the general formula:

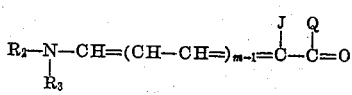

wherein $R_2$ represents a member selected from the group consisting of a hydrogen atom and an acyl group of a carboxylic acid, $R_3$ represents an aryl group selected from those of the benzene series and those of the napthalene series, J and Q together represent the non-metallic atoms necessary to complete a heterocyclic nucleus of the 2-thiobarbituric acid series and $m$ represents a positive integer from 1 to 3, in the presence of a basic condensing agent.

6. A process for preparing a dye which comprises reacting a quaternary salt selected from those represented by the general formula:

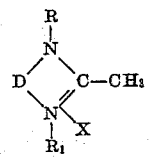

wherein R and R₁ each represents an alkyl group of the formula $C_nH_{2n+1}$ wherein $n$ represents a positive integer from 1 to 5, D represents an o-phenylene group and X represents an anion, with a compound selected from those represented by the general formula:

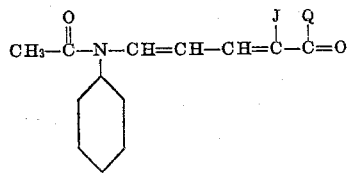

wherein J and Q together represent the non-metallic atoms necessary to complete a heterocyclic nucleus of the 2-thiobarbituric acid series, in the presence of a basic condensing agent.

7. A process for preparing a dye which comprises reacting a quaternary salt selected from those represented by the general formula:

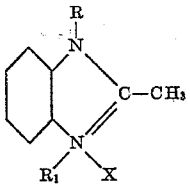

wherein R and R₁ each represents an alkyl group of the formula $C_nH_{2n+1}$ wherein $n$ represents a positive integer from 1 to 5 and X represents an anion, with a compound selected from those represented by the following general formula:

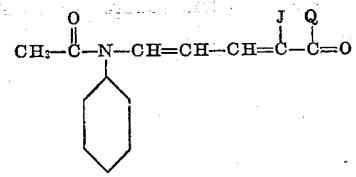

wherein J and Q together represent the non-metallic atoms necessary to complete a heterocyclic nucleus of the 2-thiobarbituric acid series in the presence of a trialkyl amine.

8. A process for preparing the dye represented by the formula:

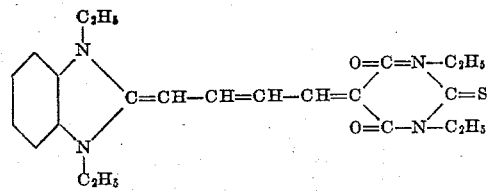

which comprises reacting 1,3-diethyl-2-methylbenzimidazolium iodide with 5-(3-acetanilidoallylidene)-1,3-diethyl-2-thiobarbituric acid in the presence of a trialkyl amine.

EARL J. VAN LARE.
LESLIE G. S. BROOKER.

REFERENCES CITED

The following references are of record in the file of this patent:

UNITED STATES PATENTS

| Number | Name | Date |
|---|---|---|
| 2,078,233 | Brooker | Apr. 27, 1937 |
| 2,177,402 | Brooker | Oct. 24, 1939 |
| 2,185,182 | Brooker | Jan. 2, 1940 |
| 2,238,231 | Reister | Apr. 15, 1941 |
| 2,256,163 | Kumetat | Sept. 16, 1941 |
| 2,317,357 | Brooker | Apr. 27, 1943 |
| 2,320,654 | Reister | June 1, 1943 |
| 2,349,179 | Kumetat | May 16, 1944 |
| 2,354,524 | Kumetat | July 25, 1944 |
| 2,388,963 | Fry | Nov. 13, 1945 |
| 2,409,189 | Brooker | Oct. 15, 1946 |
| 2,440,119 | Reister | Apr. 20, 1948 |